United States Patent [19]

Hurd

[11] Patent Number: 4,629,000
[45] Date of Patent: Dec. 16, 1986

[54] OIL RECOVERY BY SURFACTANT-ALCOHOL WATERFLOODING
[75] Inventor: Billy G. Hurd, Dallas, Tex.
[73] Assignee: Mobil Oil Corporation, New York, N.Y.
[21] Appl. No.: 862,207
[22] Filed: May 13, 1986

Related U.S. Application Data

[63] Continuation of Ser. No. 718,324, Apr. 1, 1985, abandoned, which is a continuation of Ser. No. 385,581, Jun. 7, 1982, abandoned, which is a continuation-in-part of Ser. No. 221,686, Dec. 30, 1980, abandoned.

[51] Int. Cl.⁴ .............................................. E21B 43/22
[52] U.S. Cl. .................................. 166/274; 252/8.554
[58] Field of Search ....................... 166/273, 274, 252; 252/8.55 D

[56] References Cited

U.S. PATENT DOCUMENTS

| | | | |
|---|---|---|---|
| 3,477,511 | 11/1969 | Jones et al. | 166/274 |
| 3,493,048 | 2/1970 | Jones | 166/252 |
| 3,508,611 | 4/1970 | Davis et al. | 166/252 |
| 3,508,612 | 4/1970 | Reisberg et al. | 166/274 |
| 3,827,497 | 8/1974 | Dycus et al. | 166/274 |
| 3,977,471 | 8/1976 | Gale et al. | 166/273 |
| 4,017,405 | 4/1977 | Holm | 252/8.55 D |
| 4,110,229 | 8/1978 | Carlin et al. | 252/8.55 D |
| 4,318,816 | 3/1982 | Schievelbein | 252/8.55 D |

Primary Examiner—Herbert B. Guynn
Attorney, Agent, or Firm—A. J. McKillop; M. G. Gilman; J. P. O'Sullivan, Sr.

[57] ABSTRACT

Waterflooding process for the recovery of oil from a subterranean formation in which at least a portion of the injected fluid consists of an oil slug containing a preferentially oil-soluble alcohol and a preferentially oil-soluble ether-linked sulfate or sulfonate. Specifically disclosed ether-linked surfactants include sulfonated or sulfated polyethoxylated alkylphenols. Specifically disclosed alcohols include aliphatic alcohols containing from 5 to 7 carbon atoms and having a water solubility of less than 3 percent.

8 Claims, No Drawings

OIL RECOVERY BY SURFACTANT-ALCOHOL WATERFLOODING

CROSS REFERENCE TO RELATED APPLICATION

This is a continuation of copending application Ser. No. 718,324, filed Apr. 1, 1985, now abandoned, which is a continuation of application Ser. No. 385,581, filed June 7, 1982, now abandoned, which in turn is a continuation-in-part of application Ser. No. 221,686, filed Dec. 30, 1980, now abandoned.

BACKGROUND OF THE INVENTION

1. Field of the Invention

This invention relates to the recovery of oil from subterranean oil reservoirs and more particularly to improved water-flooding operations involving the injection of an oil slug containing a perferentially oil-soluble alcohol and a preferentially oil-soluble ether-linked anionic surfactant.

2. Discussion of the Prior Art

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques has been employed in order to increase the recovery of oil from subterranean reservoirs. The most widely used supplemental recovery technique is waterflooding, which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension waterflooding, the latter term having reference to the mechanism involving the reduction of the oil-water interfacial tension. Thus far, many such waterflooding applications have employed anoinic surfactants. For example, a paper by W. R. Foster entitled "A Low-Tension Waterflooding Process", Journal of Petroleum Technology, Vol. 25, February 1973, pp. 205-210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as water-soluble biopolymer in a graded concentration in order to provide a mixiumum viscosity greater than the viscosity of the reservoir oil and a terminal viscosity near that of water. This thickened water slug is then followed by a driving fluid such as a field brine which is injected as necessary to carry the process to conclusion.

One problem encountered in waterflooding with certain of the anionic surfactants such as the sulfonates is the lack of stability of these surfactants in a so-called "high brine" environment. These surfactants tend to precipitate from solution in the presence of monovalent salts such as soldium chloride in concentrations in excess of about 2 to 3 weight percent and in the presence of much lower concentrations of divalent metal ions such as calcium and magnesium ions. Typically, divalent metal ion concentrations of about 50 to 100 ppm and above cause precipitation of the petroleum sulfonates.

Various surfactant formulations which contain anionic sulfonates that tolerate high salinities and/or high divalent metal concentrations have been proposed for use in high brine environments. Thus, U.S. Pat. No. 3,827,497 and U.S. Pat. No. 3,890,239 disclose a surfactant composition comprising a mixture of an organic sulfonate and a sulfated or sulfonated oxyalkylated alcohol and a polyalkylene glycol alkyl ether. The sulfonate is exemplified by the formula

$$C_{12}\text{-}C_{15}O(CH_2CH_2O)_mSO_3{}^-\!\!-\!\!Na^+,$$

where m is an average of 3.

Another surfactant waterflooding process employing an ether-linked anionic surfactant in high salinity environments is disclosed in U.S. Pat. No. 3,977,471. This patent discloses the use of an $R_1$ hydrocarbyl ether-linked $R_2$ hydrocarbyl sulfonate. The $R_1$ lipophilic base is provided by a benzene, toluene, or xylene radical having an alkyl substituent containing 6-24 carbon atoms and the $R_2$ group linking the sulfonate group with the alkoxy ether group is a $C_1$-$C_8$ alkyl, cycloalkyl, alkene or aryl radical. The $R_2$ hydrocarbyl group may be substituted with a hydroxy group or a $C_1$-$C_8$ aliphatic group. Dodecyl dimethylbenzene ether propane sulfonate is specifically disclosed by patentees. The patent process is said to be particularly useful in reservoirs having high salinity brines, i.e. salinities of 2% or more, and the dodecyl dimethylbenzene ether propane sulfonate is said to be stable in saline solutions containing from 7-14 weight percent sodium chloride. U.S. Pat. No. 4,161,983 discloses the use of similar sulfonates.

In addition to the use of the ether-linked surfactants in aqueous surfactant solutions, U.S. Pat. NO. 3,977,471 discloses that the surfactants may be used in liquid hydrocarbon solvents or in microemulsions. The microemulsion contains a refined or crude oil, an aqueous medium, and the previously described ether-linked surfactant. In addition, the microemulsion may contain a co-surfactant. Particularly effective co-surfactants are said to include alcohols, ethoxylated alcohols, sulfated ethoxylated alcohols, sulfonated ethoxylated alcohols, ethoxylated phenols, sulfated ethoxylated phenols and synthetic sulfonates. Alcohols disclosed in the patent for use as microemulsion co-surfactants include $C_3$-$C_{20}$ aliphatic alcohols such as isopropanol, isobutanol, tertiary butanol, amyl alcohols, hexanols, octanols, and dodecanols. The patentees specifically disclose flooding with microemulsion systems containing 91% to 93% water containing 6% sodium chloride, 5% oil, 1% to 3% dodecyl dimethylbenzene ether propane sulfonate, and 1% butyl alcohol.

Yet another surfactant waterflooding process involving the use of an anionic ether-linked surfactant is disclosed in U.S. Pat. No. 4,018,278. The ether-linked surfactants employed include sulfonated polyethoxylated aliphatic alcohols and sulfonated polyethoxylated alkylphenols. The patentee discloses the use of the ether-linked sulfonates alone or as a co-surfactant with anionic surfactants such as petroleum sulfonates and in high brine environments, e.g., in a solution having a salinity of 183,000 ppm and a total hardness of 9400 ppm. The surfactant system is said to be particularly useful at temperatures in excess of 120° F. Also, U.S. Pat. No. 4,217,957 discloses an aqueous mixture of an alkylbenzene ethoxylated propylene sulfonate and the dialkylbenzene derivative, useful in waterflooding.

SUMMARY OF THE INVENTION

In accordance with the present invention, there is provided a new and improved waterflooding process employing an alcohol and ether-linked surfactant which exhibit oil solubility preferences. In carrying out the invention, at least a portion of the fluid introduced into the oil reservoir via a suitable injection system is oil slug liquid containing a preferentially oil-soluble alcohol of limited water solubility and a preferentially oil-soluble anionic surfactant comprising a hydrocarbyl ether-linked sulfonate or sulfate wherein the hydrocarbyl group provides a lipophilic surfactant base and wherein the ether linkage is provided by an alkoxy linkage having a ratio of carbon atoms to oxygen atoms within the range of 2 to 3. In a preferred embodiment of the invention, the preferentially oil-soluble alcohol is an aliphatic alcohol containing from 5 to 7 carbon atoms. The alcohol is employed in a concentration such that the weight ratio of the alcohol to the preferentially oil-soluble surfactant is within the range of about 0.2 to 1.0. Preferred ether-linked surfactants for use in the invention are sulfonated polyethoxylated aliphatic phenols having 1 to 20 ethylene oxide units, preferably from about 3 to about 10, and in which the phenyl nucleus has attached thereto at least 2 linear or branched-chain aliphatic groups containing from 8 to 12 carbon atoms. The multiple groups are chosen so that together they total at least 16 carbon atoms.

DESCRIPTION OF SPECIFIC EMBODIMENTS

Ether-linked anionic surfactants are old and well known in the detergent art. For example, Schwartz et al., SURFACE ACTIVE AGENTS AND DETERGENTS, Vol. II, 1958, Interscience Publishers, Inc., New York, disclose ether-linked sulfonates under the headings "Sulfonates with Intermediate Linkages" at pages 71–78 and "Alkylarylsulfonates with Intermediate Linkages" at pages 91–93. As noted previously, the aforementioned patents disclose the use of anionic ether-linked sulfates in surfactant waterflooding processes or the use of ether-linked sulfonates in such processes. Applicant's invention involves surfactant waterflooding in which such anionic ether-linked sulfonates are employed in conjunction with alcohols under conditions such that the surfactant and alcohol exhibit oil solubility preferences. More specifically, the alcohol which is both water and oil-soluble is preferentially oil soluble, That is, with equal amounts of oil and water, a greater amount of the alcohol will dissolve in the oil than in the water or stated otherwise, if the alcohol is exposed to both oil and water phases, the alcohol will tend to partition between the two with a greater concentration in the oil phase. The preferred alcohols may be characterized as having a water solubility at the reservoir temperature of less than 3.0 weight percent and preferably less than 1.0 weight percent and as being substantially oil miscible. The anionic ether-linked sulfonate or sulfate employed in conjunction with the alcohol is preferentially oil soluble also.

The sulfonate or sulfate anionic group may be linked to any suitable hydrocarbon group which provides a lipophilic base of the surfactant as disclosed in the aforementioned patents. Thus, the lipophilic base of the anionic ether-linked sulfonates or sulfates employed in the present invention may be provided preferably by dialiphatic substituted aryl groups. Where the lipophilic base is provided by a dialiphatic substituted aryl group, the aryl component may be mononuclear (phenyl) or dinuclear (naphthyl). Preferably the aryl component will be mononuclear in view of the practical consideration of ecomony and product availability. The aryl group is substituted with at least 2 linear or branched-chain aliphatic groups, each having at least 8 carbon atoms, with the total number of aliphatic carbon atoms being within the range of 16 to 24.

The ether linkage of the anionic ether-linked sulfates or sulfonates employed in carrying out the present invention preferably is provided by an alkoxylated group having a ratio of carbon atoms to oxygen atoms within the range of 2 to 3. Stated otherwise, the ether linkage is derived from ethylene oxide or propylene oxide or mixtures of ethylene oxide and propylene oxide. The number of alkoxy groups in the ether linkage will vary depending upon such factors as the character of the lipophilic surfactant base and the salinity of the aqueous surfactant solution, but normally the ether linkage will contain from 1 to 20 alkylene oxide units.

A preferred ether-linked sulfonate for use in carrying out the present invention is characterized by the formula

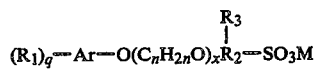

wherein $R_1$ is a linear or branched-chain aliphatic group containing from 8 to 12 carbon atoms, and wherein $R_1$ may be the same or different, n is 2 or 3, q is at least 2, x is a number within the range of 1 to 20, Ar is phenyl or naphthyl, $R_2$ is a $C_1$ to $C_4$ alkylene group, $R_3$ is a hydrogen, a hydroxy group or a methyl group, and M is an alkali metal, ammonium, or substituted ammonium ion, and wherein the $R_1$ groups provide a total of at least 16 carbon atoms.

The useful sulfates may be characterized by the formula:

wherein $R_1$ n, q, x, Ar and M have the same meaning as above.

Where M is an alkali metal ion, it usually will take the form of sodium or potassium. Substituted ammonium ions which may be employed include mono-, di-, or tri-substituted alkylammonium or alkanolammonium ions. Examples of alkylammonium ions include methylammonium, ethylammonium, and normal or isopropylammonium ions and examples of alkanolammonium ions include monoethanolammonium and triethanolammonium ions.

Preferably the ether linkage is provided by one or more ethylene oxide groups. Thus, in a preferred form of surfactant characterized by formula (1), n is 2 and x is a number within the range of 3 to 8. In the case where the lipophilic group R₁ is a dialiphatic substituted aryl group, the aliphatic substituents preferably provide at least 18 carbon atoms. In this instance, as noted previously, it is desirable that a mononuclear aryl radical such as phenyl be employed. As indicated by the formulae, the alkyl group connecting the sulfonate group with the ether linkage is provided by a $C_1$ to $C_4$ aklylene group which may be unsubstituted or which may be substituted by a hydroxy group or a methyl group. Preferably, however, the alkylene linkage is provided by an ethylene or propylene group which is unsubstituted or substituted by a hydroxy group. That is, preferably $R_2$ contains 2 or 3 carbon atoms and $R_3$ is a hydrogen atom or hydroxy group.

The results of laboratory oil displacement tests carried out with regard to an aromatic crude oil are set forth in Table I. The oil displacement tests were carried out employing 5-foot long flow tubes having an inside diameter of about ¼ inch. In each tube run, the tube was packed with unconsolidated Berea sand and then saturated with saline water. The crude oil was then flooded into the tube until the effluent from the tube contained no water, with the total amount of water being displaced from the tube during this operation being measured to determine the initial oil saturation. Each tube was then subjected to a simulated waterflood by injecting a brine in an amount as necessary until the effluent was free of oil. The amount of oil produced during this operation was measured in order to determine the residual oil saturation after waterflood of the tube. A simulated surfactant waterflood was then carried out by injecting an oil slug surfactant slug (surfactant plus alcohol dissolved in West Ranch crude) followed by the injection of a driving aqueous fluid until the effluent from the tube was free of oil. The driving fluid was water containing 6.6% TDS, including 0.15% by wt. of $Ca^{++}$ and $Mg^{++}$ (total) and 0.1% by wt. of Kelzan. This is the anionic polysaccharide B-1459 produced by fermentation of glucose with the bacterium *Xamthomonas campestris* (NRRL B-1459 USDA), which is available from the Kelco Company as "Kelzan". The amount of oil recovered during this operation was measured in order to arrive at the final residual oil saturation and the amount of tertiary oil recovered.

The surfactant was

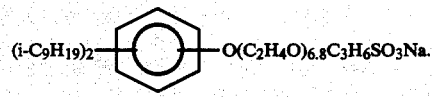

TABLE 1

| Run No. | PV | Surfactant Slug | | | % WFRO[1] | % SORC[2] |
|---|---|---|---|---|---|---|
| | | % Wt. Surfactant | Alcohol | % Alcohol | | |
| 1 | 0.093 | 7.7 | none | none | 76.5 | 5.0 |
| 2 | 0.093 | 7.7 | nC₅OH | 2.0 | 85.6 | 3.2 |
| 3 | 0.093 | 7.7 | nC₅OH | 4.0 | 88.5 | 2.5 |
| 4 | 0.093 | 7.7 | nC₆OH | 2.0 | 89.0 | 2.3 |
| 5 | 0.093 | 7.7 | nC₆OH | 4.0 | 99.0 | 0.3 |
| 6 | 0.055 | 7.7 | nC₆OH | 4.0 | 80.9 | 4.2 |
| 7 | 0.055 | 7.7 | nC₆OH | 6.0 | 66.5 | 7.2 |

[1]Tertiary oil recovery as percentage of waterflood residual oil.
[2]Residual oil saturation following chemical flood.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein is meant that volume of the portion of the formation underlying the well pattern employed, as described in greater detail in the Burdyn et al. patent.

The present invention may be carried out in conjunction with the use of a thickening agent added for mobility control purposes. Where a separate mobility control slug is employed, it normally will be injected immediately after the slug containing the surfactant. The thickening agent may be added in concentrations so as to provide a graded viscosity at the trailing edge of the mobility control slug as disclosed in the aforementioned paper by Foster or graded viscosities at both the leading and trailing edges of the mobility control slug as disclosed in U.S. Pat. No. 4,018,281 to Chang. Alternatively, the thickening agent concentration may be relatively constant throughout. Normally, the viscosity of at least a portion of the mobility control slug should be at least as great as that of the reservoir oil and typically it will be within the range of about 1 to 4 times the viscosity of the reservoir oil. Various thickening agents which may be employed for mobility control purposes are well known to those skilled in the art and include such polymers as the bipolymer "Kelzan", previously identified, and the various partially hydrolyzed polyacrylamides available from the Dow Chemical Company under the trade name "Pusher" chemicals.

The ether-linked surfactant may be present in any suitable concentration depending upon the characteristics of the particular reservoir involved and such factors as surfactant consumption, e.g., by adsorption, and dispersion of the surfactant into the reservoir water. The surfactant concentration may range from 0.01 to 15 weight percent although in most applications the surfactant will be employed in a concentration within the range of about 1 to about 10 weight percent. The alcohol concentration will, of course, depend upon the concentration of the surfactant and the desired ratio of alcohol to surfactant. The oil slug containing the alcohol and ether-linked surfactant may be injected in amounts ranging from about 0.01 to about 0.1 pore volumes with the larger pore volume amounts being used with the lower surfactant concentrations. Usually it will be desired to inject the alcohol-surfactant slug in an amount within the range of about 0.01 to about 0.05 pore volumes.

I claim:

1. In a method for the recovery of oil from a subterranean oil reservoir penetrated by spaced injection and production systems in which an aqueous fluid is introduced into said reservoir via said injection system to displace oil to said production system, the improvement comprising preceding the aqueous fluid introduction with an oil slug consisting of oil, a preferentially oil-soluble alcohol of limited water solubility having from 5 to 7 carbon atoms and a preferentially oil-soluble anionic surfactant is within the range of 0.2–1.0, said surfactant characterized by one of the formulae

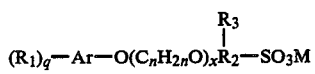

and

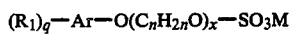

wherein the $R_1$ groups are the same or different and are straight or branched-chain aliphatic groups containing from 8 to 12 carbon atoms, n is 2 or 3, q is at least 2, x is a number within the range of 1 to 20, Ar is phenyl or naphthyl, $R_2$ is a $C_1$ to $C_4$ alkyl group, $R_3$ is a hydrogen, a hydroxy group or a methyl group, and M is an alkali metal, ammonium, or substituted ammonium ion.

2. The method of claim 1 wherein said alcohol has a water solubility at the temperature of said reservoir of less than 3.0 weight percent.

3. The method of claim 1 wherein said alcohol is pentanol.

4. The method of claim 1 wherein said alcohol is hexanol.

5. The method of claim 1 wherein n is 2 and x is a number within the range of 3 to 10.

6. The method of claim 1 wherein the said oil-soluble anionic surfactant has the formula

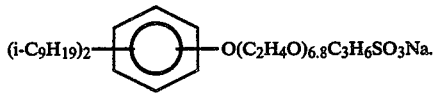

7. The method of claim 6 wherein the alcohol is pentanol.

8. the method of claim 6 wherein the alcohol is hexanol.

* * * * *